(12) United States Patent
Samchuk et al.

(10) Patent No.: US 9,955,183 B2
(45) Date of Patent: Apr. 24, 2018

(54) OPEN TO CLOSED GROUP OF PICTURES CONVERSION IN INTERFRAME VIDEO COMPRESSION

(71) Applicant: Avid Technology, Inc., Burlington, MA (US)

(72) Inventors: Sergii Samchuk, Kyiv (UA); Viktor Babkov, Makiivka (UA); Oleksii Korbachevskyi, Kyiv (UA); Jochen Pielage, Munich (DE); Ingo S. Höntsch, Garching (DE); Brian M. Nowokunski, Leonminster, MA (US); Allan C. Green, Natick, MA (US)

(73) Assignee: AVID TECHNOLOGY, Inc., Burlington, MA (US)

( * ) Notice: Subject to any disclaimer, the term of this patent is extended or adjusted under 35 U.S.C. 154(b) by 200 days.

(21) Appl. No.: 15/181,750

(22) Filed: Jun. 14, 2016

(65) Prior Publication Data
US 2017/0302959 A1    Oct. 19, 2017

Related U.S. Application Data

(60) Provisional application No. 62/322,684, filed on Apr. 14, 2016.

(51) Int. Cl.
*H04N 19/44* (2014.01)
*H04N 19/577* (2014.01)

(52) U.S. Cl.
CPC .......... *H04N 19/577* (2014.11); *H04N 19/44* (2014.11)

(58) Field of Classification Search
CPC ....... H04N 19/63; H04N 19/577; H04N 19/44
See application file for complete search history.

(56) References Cited

PUBLICATIONS

Brightwell et al, Flexible Switching and Editing of MPEG-2 Video Bitstreams, IBC 1997, IEE Conference Publication, White Paper, Sep. 12-16, 1997, pp. 547-552.

*Primary Examiner* — Jonathan Messmore
(74) *Attorney, Agent, or Firm* — Oliver Strimpel

(57) ABSTRACT

Methods of converting an open group of pictures (GOP) to a Closed GOP are described that remove backward references to the GOP prior to the GOP undergoing conversion in an Open GOP interframe-encoded video stream. Within the GOP undergoing conversion, bipredictive frames with backward references to the prior GOP are replaced with frames referring only to the I frame of the GOP undergoing conversion, which is flagged as an IDR frame. Consolidation and assembly of video clips that are encoded using Open GOP compression schemes generally result in broken interframe references between GOPs. To address this, existing methods involve significant decoding and re-encoding of edited video sequences. The described methods serve to break the backward chain of references in the encoded stream, resulting in reduced re-encoding requirements, with attendant reduced quality degradation of the edited sequence.

9 Claims, 6 Drawing Sheets

OPEN TO CLOSED GROUP OF PICTURES CONVERSION IN INTERFRAME VIDEO COMPRESSION

CROSS REFERENCE TO RELATED APPLICATION

This application claims right of priority to and the benefit under 35 U.S.C. § 119(e) of U.S. provisional patent application Ser. No. 62/322,684, filed Apr. 14, 2016, which is incorporated herein by reference.

BACKGROUND

As uncompressed video bandwidth increases with the increasing size of video rasters, greater dynamic range, and faster frame rates, uncompressed video bandwidth continues to increase. In addition, media is being consumed by mobile devices across the globe, sometimes having access only to limited bandwidth. Thus there is an increasing need for compute-efficient, high quality video compression. One approach to video compression involves the use of interframe compression, in which certain frames are encoded in a predictive manner from other frames. Such compression schemes are used in video standards such as MPEG-2, in which a video sequence is broken into groups of pictures (GOPs) that include one frame that does not refer to any other frames (intraframe or I frame) and a set of predictive frames that refer to the I frame, and sometimes also to other predictive frames. When all the references remain within a given GOP, the GOP is a Closed GOP.

In response to the need for increased video compression, some compression schemes, notably H.264, broaden the scope of possible references for predictive frames so that they can refer to frames contained within a previous GOP. Such GOPs are called Open GOPs. However, while such schemes generally provide greater compression, certain problems arise when Open GOP bitstreams are cut, such as when consolidating media files or when cutting from one sequence to another during editing.

SUMMARY

Methods of converting an Open GOP to a Closed GOP in an encoded video stream, such as an H.264-encoded stream, are described. The method has particular application to consolidate and clip assembly workflows that commonly arise in the context of video editing. In general, in one aspect, a method of converting an Open GOP used in interframe video compression into a Closed GOP comprises: receiving an encoded bitstream that has been encoded using Open GOP interframe video compression; extracting a first Open GOP from the bitstream; decoding at least part of the first Open GOP to generate a first group of uncompressed frames of video; extracting a second Open GOP sequentially following the first Open GOP in the bitstream, wherein the extracted second GOP comprises a series of encoded frames including an intra-coded picture (I frame); referring to at least one frame of the first group of uncompressed frames, decoding the second Open GOP to generate a second group of uncompressed frames of video; re-encoding at least a portion of the second group of uncompressed frames to generate a re-encoded second GOP comprising one or more re-encoded bipredictive coded pictures (B frames) having a display order preceding an I frame of the second GOP, the re-encoded B frames being re-encoded with reference to a frame generated by decompressing the I frame of the second GOP as received in the bitstream and without reference to a frame of the first Open GOP; converting the second Open GOP to a corresponding Closed GOP, the Closed GOP comprising: the one or more re-encoded B frames; the I frame of the second GOP as received in the encoded bitstream, wherein the encoder flags the I frame of the second GOP as received in the encoded bitstream as an instantaneous decoder refresh (IDR) frame; and encoded data as received in the encoded bitstream for each frame of the second GOP that is displayed sequentially following the I frame of the second GOP.

Various embodiments include one or more of the following features. The bitstream represents part of an encoded video clip that is being consolidated to generate a consolidated video clip, and the second Open GOP that is converted into a corresponding Closed GOP is a first full GOP of the consolidated video clip sequentially following a start point of the consolidated video clip. The start point of the consolidated video clip is a start point of the first full GOP of the consolidated video clip. The start point of the consolidated clip falls within the first GOP, and the consolidated clip includes a short GOP prior to the first full GOP, wherein the short GOP is a Closed GOP comprising frames of the first GOP temporally subsequent to the start point of the consolidated clip. The bitstream represents an encoded video clip that is being assembled into a sequence comprising portions of a plurality of clips, and the second Open GOP that is converted into a corresponding Closed GOP is a first full GOP of a portion of the encoded video clip that is included in the assembled sequence. The encoded bitstream is encoded using intraframe compression in addition to the Open GOP interframe compression. The intraframe compression is lossy. The bitstream is an H.264 encoded bitstream.

In general, in another aspect, a computer program product comprises a non-transitory computer-readable medium with computer program instructions encoded thereon, wherein the computer program instructions, when processed by a computer, instruct the computer to perform a method of converting an Open GOP used in interframe video compression into a Closed GOP, the method comprising: receiving an encoded bitstream that has been encoded using Open GOP interframe video compression; extracting a first Open GOP from the bitstream; decoding the first Open GOP to generate a first group of uncompressed frames of video; extracting a second Open GOP sequentially following the first Open GOP in the bitstream, wherein the extracted second GOP comprises a series of encoded frames including a intra coded picture (I frame); referring to at least one frame of the first group of uncompressed frames, decoding the second Open GOP to generate a second group of uncompressed frames of video; using an encoder that is substantially the same as the encoder that was used to encode the received bitstream, re-encoding at least a portion of the second group of uncompressed frames to generate a re-encoded second GOP comprising one or more re-encoded bipredictive coded pictures (B frames) having a display order preceding an I frame of the second GOP, the re-encoded B frames being re-encoded with reference to a frame generated by decompressing the I frame of the second GOP as received in the bitstream and without reference to a frame of the first Open GOP; converting the second Open GOP to a corresponding Closed GOP, the Closed GOP comprising: the one or more re-encoded B frames; the I frame of the second GOP as received in the encoded bitstream, wherein the encoder flags the I frame of the second GOP as received in the encoded bitstream as an instantaneous decoder refresh (IDR) frame; and each frame of the second GOP that is displayed sequentially following the I frame of the second GOP in the form that the frame was received in the encoded bitstream.

DETAILED DESCRIPTION

Figure 1:
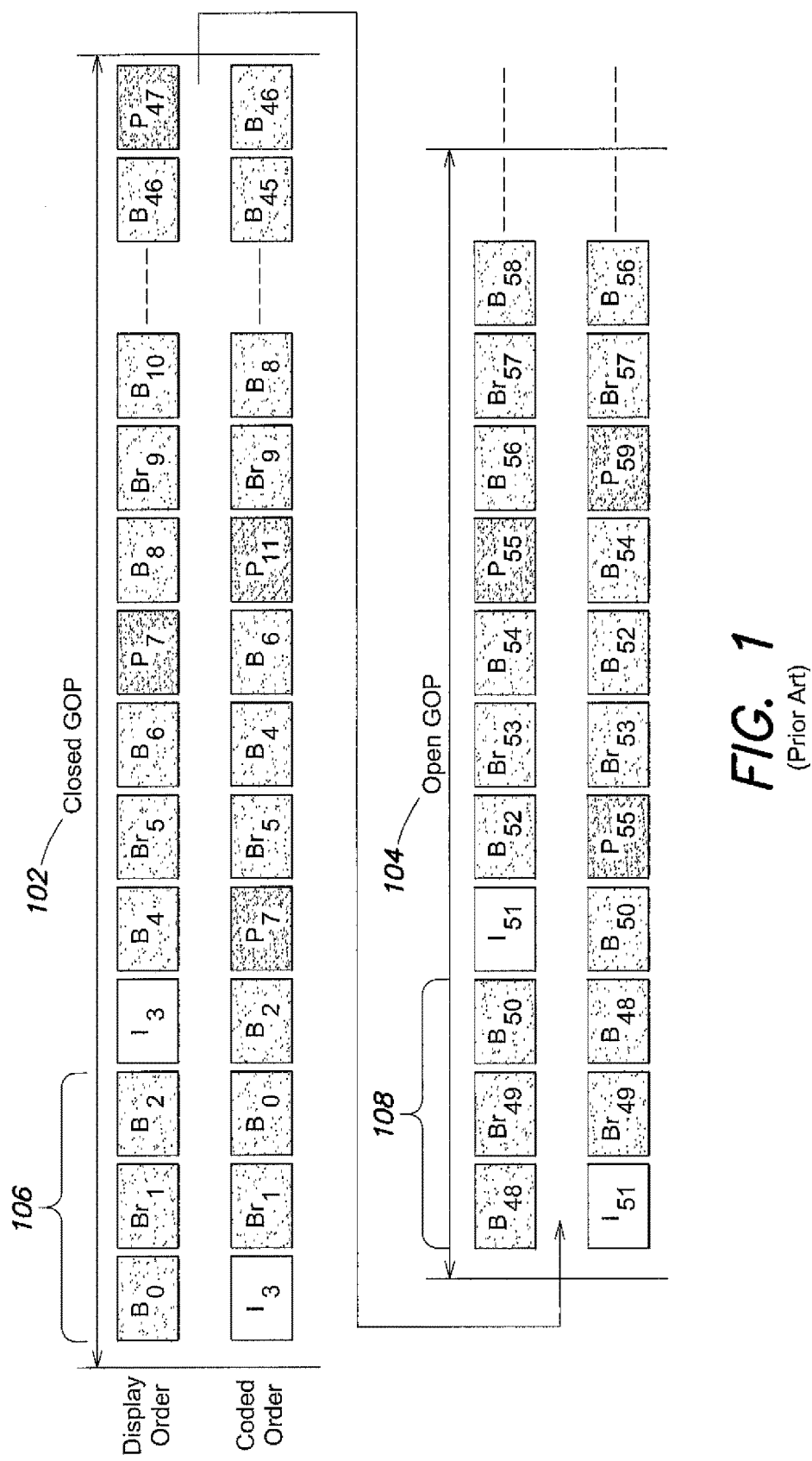
FIG. 1 illustrates the display order and coded order of video frames in an exemplary video bitstream comprising a Closed GOP followed by an Open GOP.

In video coding, a GOP is a group of successive pictures within an encoded video stream. Each encoded video stream is a series of successive GOPs. Each GOP contains one frame (I frame) that is compressed using intraframe compression without reference to any other frames. In the order in which the frames are stored in the coded bitstream (coded order), each GOP begins with an I frame. Other frames in a GOP include predictive-coded frames (P frames) that contain motion-compensated difference information relative to previously decoded and displayed pictures. Bipredictive coded frames (B frames) contain motion-compensated difference information relative to previously decoded pictures that may also follow the B frame in display order.

As indicated in the introduction above, Open GOPs are defined as GOPs in which at least one of the predictive frames contains motion-compensated difference information relative to a picture contained within the previous GOP. However, the first GOP of a video stream is a special case since it cannot refer to frames of a previous GOP. Thus any Open GOP video stream must start with a Closed GOP. While this can be done straightforwardly when encoding a sequence from its start, the situation is different when an existing Open GOP stream is cut somewhere within the stream. If the cut takes place somewhere within a GOP, any frames in the Open GOP containing the frames following the cut point and making a backward reference to a frame in the previous GOP will have their references broken. Even if the cut takes place at a GOP boundary, the same problem arises. Since each Open GOP following the cut includes frames that may be referred to by frames in its subsequent GOP, once frames in a given GOP are changed, the effect of the change cascades along the video stream until the next Closed GOP in the video stream, or if there is none, to the end of the stream. Current methods resolve this problem by decoding and re-encoding a significant portion, if not all of the stream from the cut point onwards. This is compute-intensive and degrades the quality of the video as the compression schemes are lossy, and thus information is lost on each decode/re-encode cycle.

The problem arises in three contexts. (i) In a constrained consolidate operation, an Open GOP stream such as an H.264 GOP stream needs to be truncated at a GOP boundary at the start of the stream. The result is required to be a fully compliant bitstream. In the case of an H.264 stream, a fully compliant stream should not violate any aspect of the ITU-T REC H.264 standard, and should successfully pass established bit-stream analyzers, such as those used by broadcasters as acceptance tools. The described method involves re-encoding of the original encoded material up to but not including the I frame of the start GOP and converting the GOP into an instantaneous decoder refresh (IDR) GOP, using the methods described below. This serves to maintain image quality as it requires only a minimum of frame decoding/re-encoding to minimize generation loss. It also provides a significant performance gain that follows from the minimal amount of processing involved. (ii) In a generic consolidate operation, an Open GOP stream is cut at an arbitrary location at the start of the stream, not necessarily at a GOP boundary, again with the requirement that the result be a fully compliant bitstream. Again, the method involves minimal re-encoding of the original encoded material up to but not including the I frame of the GOP following the cut point, creating a short GOP in front of the original GOP boundary as necessary. The next GOP is converted from an open to a Closed GOP using the methods described below. (iii) In an assemble editing operation in which GOP stream B is appended to an existing stream A, the start (left side in a timeline view) of the last GOP in stream A up to the cut point, and the end (right side) of the GOP from stream B from the cut point to the first full GOP following the cut point form a new GOP (a bridge GOP) which is re-encoded. The next GOP is converted from an open to a Closed GOP using the methods described below.

We now describe in detail a method for converting an Open GOP into a Closed GOP that obviates the need to decode and re-encode any of the GOPs in a video stream that follow the converted GOP. FIG. 1 shows an example of a video stream starting with Closed GOP 102 followed by Open GOP 104. In this example, the GOP size is 48 frames, and each GOP includes three B frames 106, 108 that are displayed before the I frame. While B frames 106 do not contain any backward references, B frames 108 of the Open GOP refer back to frames in GOP 102. It is these links that must be removed if Open GOP 104 is not to make any reference to a prior GOP.

Figure 2:
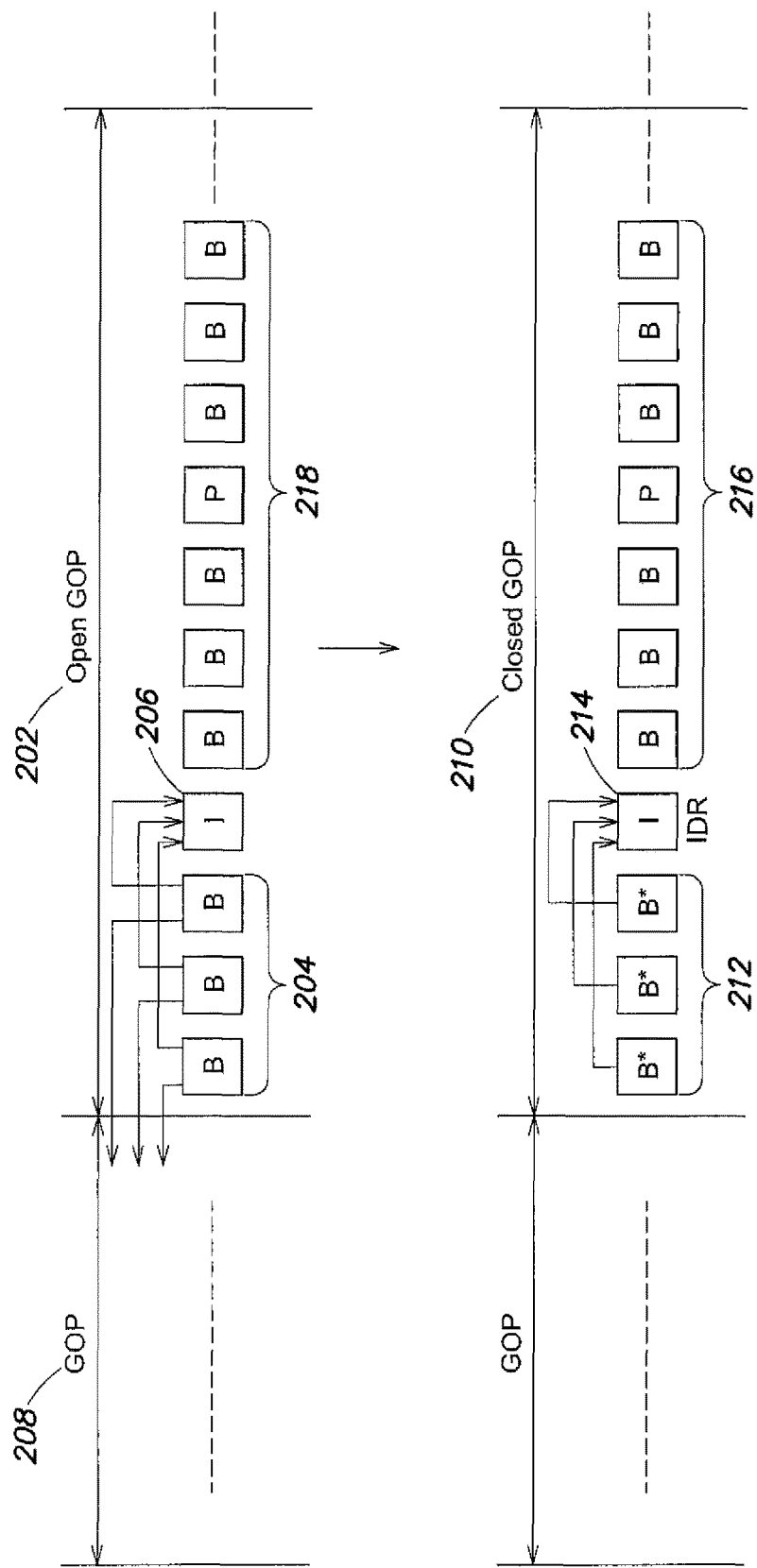
FIG. 2 illustrates the conversion of an Open GOP to a Closed GOP.
Figure 3:
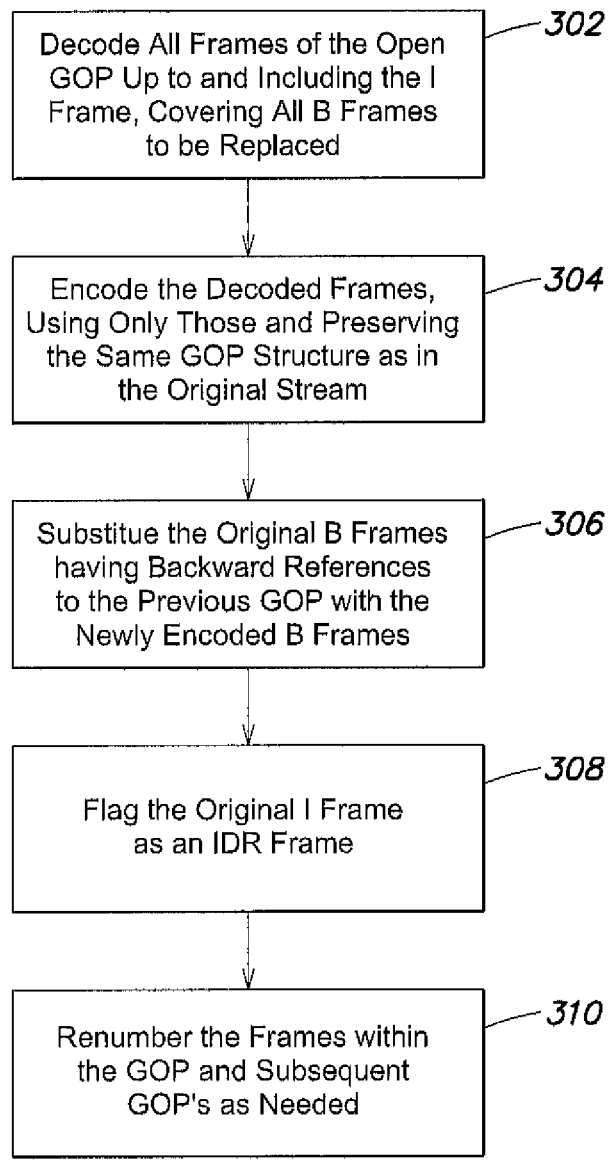
FIG. 3 shows a series of steps involved in the conversion of an Open GOP to a Closed GOP.

Referring to FIG. 2, Open GOP 202 includes three B frames 204 that are displayed before I frame 206. In the figure, frames are shown in display order (as opposed to coded order). Each of the B frames was generated by using motion compensated predictions with reference to I frame 206, as indicated by the forward-pointing arrows to the I frame, as well as with reference to one or more frames of prior GOP 208, as indicated by the backward-pointing arrows. The steps of the Open GOP to Closed GOP conversion process include the five steps shown in FIG. 3. In first step 302, the initial (B) frames (to be replaced) of Open GOP 202, up to and including the I frame, are decoded, using (previously) decoded frames from preceding GOP 208. In the example illustrated in FIG. 2, these are the three B frames 204. In step 304, the decoded B frames are re-encoded with reference only to the decoded I frame preserving the same GOP structure as in the original stream. In addition to the GOP structure, to the extent possible, the parameters used in the decoding and re-encoding process match those that were used to encode the original stream. Replacement Closed GOP 210 is assembled as follows. In step 306, original B frames 204 are substituted by re-encoded frames 212, designated as B* frames in FIG. 2. The B* frames differ from the original B frames not only in that they rely solely on references to the I frame in the GOP (i.e., any backward and forward references are targeted to the I frame), but are also of degraded quality having gone through a lossy decode/re-encode cycle. Immediately following B* frames 212 in Closed GOP 210 is I frame 214. In step 308, original I frame 206 of GOP 202 is flagged as an IDR frame. IDR frames are placed at the beginning of a sequence, and in some codecs at various points within a GOP sequence. The effect of the IDR frame in a GOP is to signal to the decoder that the GOP is to be treated as a Closed GOP, with the result that any B frames to be displayed before the I frame have forward references only. It also causes the picture number sequence to be restarted at 0, requiring renumbering of the frames within GOP 210 and frames within succeeding GOPs until the next IDR GOP or the end of the GOP sequence if there are no further IDRs present. The remaining frames 216 of GOP 210 are unchanged from corresponding frames 218 of original GOP 202. Since all frames displayed subsequent to I frame 214 refer back no further than I frame 214, none of remaining frames 216 are affected by the changed B frames 212, and there is no need for these frames, or frames of succeeding Open GOPs, to undergo a decode/re-encode cycle. Flagging the converted GOP as an IDR GOP ensures that the stream is fully compliant, i.e., it is able to be decoded by any decoder consistent with a standard, e.g., H.264, without causing any errors.

To summarize, a GOP that has been converted into a Closed GOP from an Open GOP contains substituted B frames (B*, FIG. 2, 212), the original I frame flagged as an IDR frame (214), and the remaining encoded frames of the original Open GOP (216). The use of the IDR-flagged original I frame rather than the I* frame that would be generated after the I frame undergoes the same decode/re-encode cycle as performed for B* frames results in an apparent inconsistency between B* frames 212 and I frame 214 in converted GOP 210. This is minimized by setting the parameters in the encoding and decoding steps as closely as possible to those used when the original video stream was encoded. Since the I frame is of better quality than an I* frame as it has not undergone a decode/re-encode cycle, it provides a more faithful reference for the B* frames that may improve the quality of the decoded B* as compared to frame decoded with reference to an I* frame. On the other hand, when the B* frames are decoded, they will include predictive information that has undergone one more cycle of encoding and decoding than the decoded I frame to which they make reference, which may appear to risk generating errors in the decoding process. However, due to the referencing scheme between the B and I frames this does not cause any invalid values in the decoded B* frames.

We now describe the consolidate and assembly contexts referred to above for which Open GOP to Closed GOP conversion is advantageous. When a video sequence is consolidated, only the portions of media files edited into the sequence are copied as newly created clips (often referred to as master clips) for each clip included in the sequence. This allows the unused portions of the media files to be deleted in order to save storage space. The consolidate process also serves to create back-up files and to gather dispersed media onto a single drive for storage or transfer to another system. Thus, during the consolidate process, the parts of a video clip that are to be used in an edited video sequence are separated from the parts of the clip that are not used. The point of separation takes place at a cut point, i.e., the point at which the portion of the clip to be included in the edited sequence starts. In the constrained consolidate process, the cut point falls on a GOP boundary. In the generic consolidate process, the cut point typically falls within a GOP. In both cases, the first full GOP of the edited portion must be converted from an Open GOP into a Closed GOP. When the cut point falls within a GOP, the first full GOP is preceded by a short Closed GOP comprising portion of the cut GOP being included in the consolidated clip. As indicated above, existing methods usually require the decoding and re-encoding not only of the GOP spanning the cut point, but all subsequent Open GOPs due to the propagation of references along the stream, with the consequent high computation load and quality degradation. The use of the methods for converting an Open GOP to a Closed GOP described herein provide a means of performing a consolidate without the need to decode and re-encode more than a short GOP that begins the consolidated clip and at least part of the first full GOP of the consolidated clip.

Figure 4:
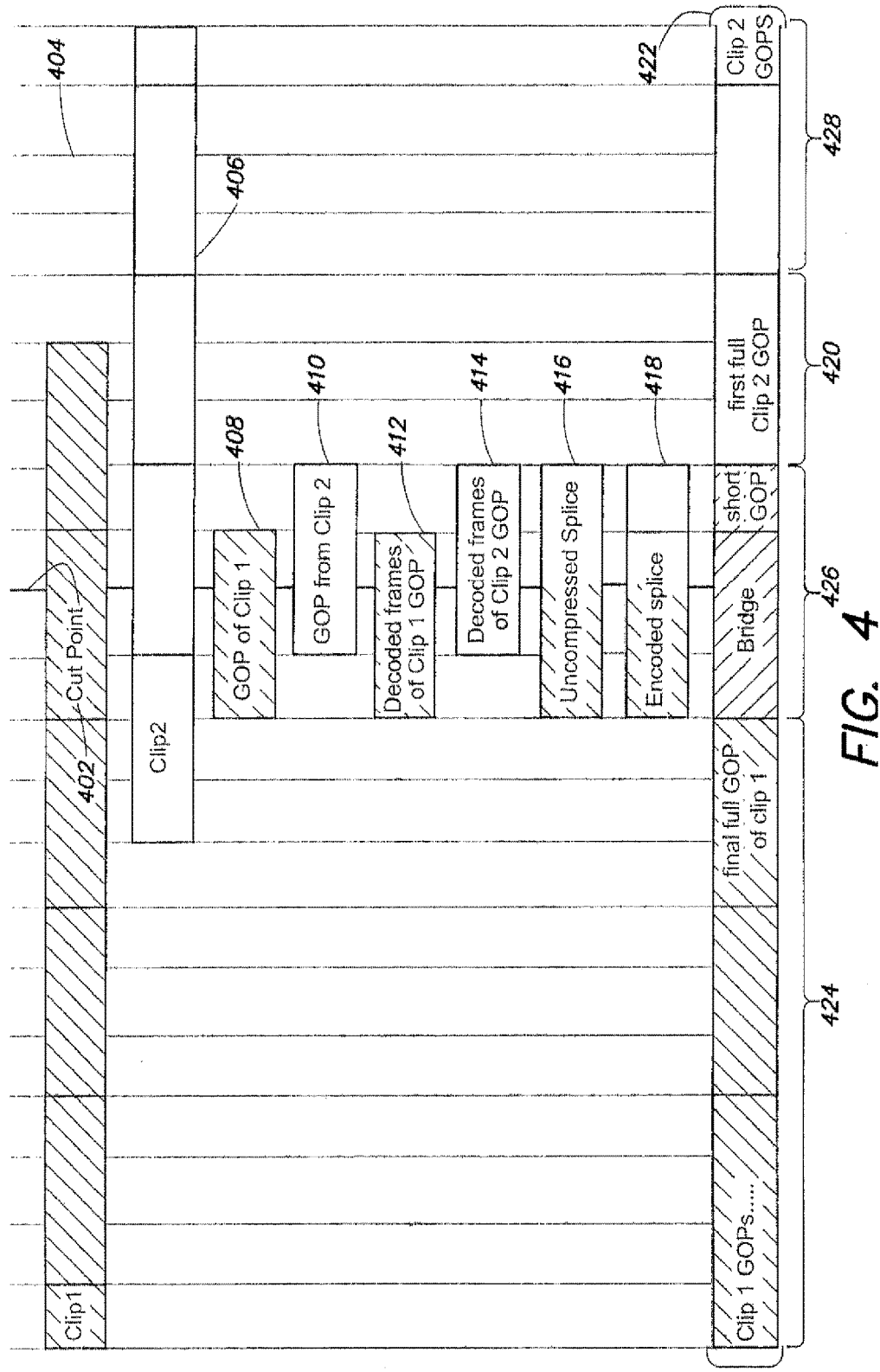
FIG. 4 is a timeline representation of GOP assembly.
Figure 5:
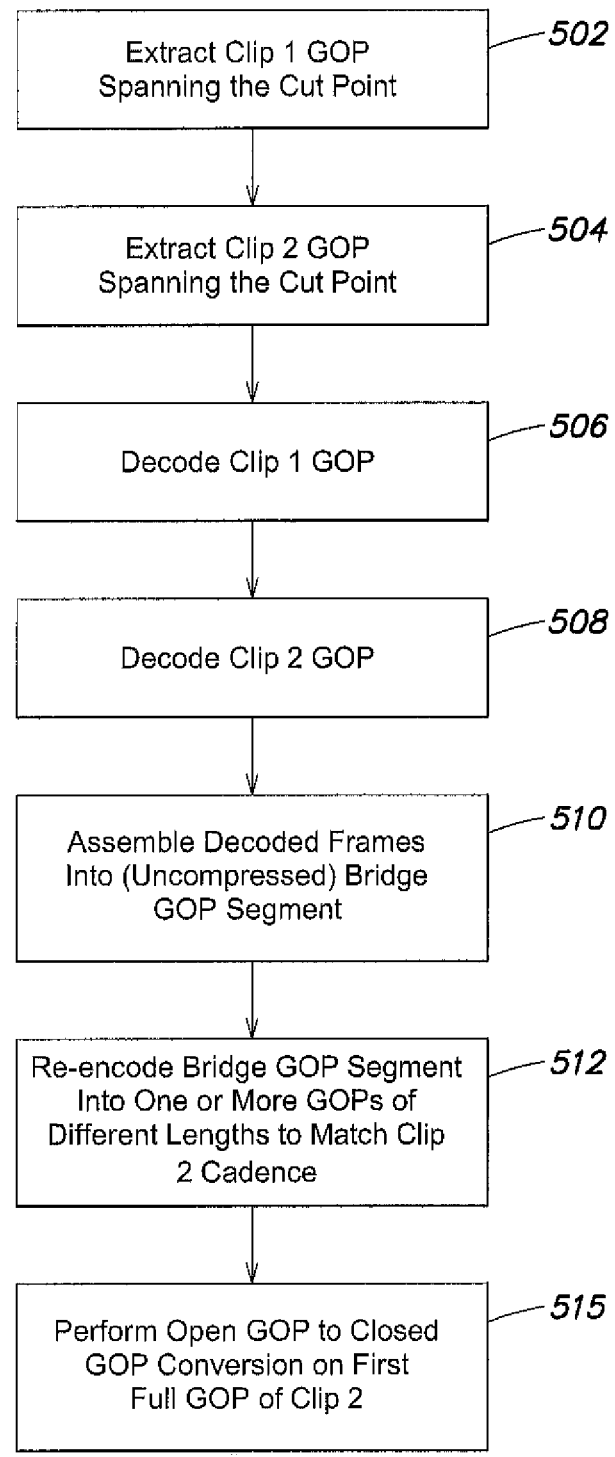
FIG. 5 shows a series of steps involved in GOP assembly using Open to Closed GOP conversion.

In the assembly editing context, parts of two clips are assembled to create a sequence starting with a portion of a first clip, and cutting over at some point to a portion of a second clip. When the clips are in the form of interframe-encoded bitstreams, the beginning of the second clip portion cannot simply be appended to the end of the first clip portion without breaking interframe references between GOPs and, in most cases, also within a GOP spanning the cut point. FIG. 4 is a timeline-style illustration of the assembly of two clips (clip 1 and clip 2) and steps included in the process are shown in FIG. 5. Referring to FIG. 4, cut point 402 cuts clip 1 404 and clip 2 406, splitting GOPs spanning the cut point within each of the clips. Generally, the GOP boundaries of clip 1 are not temporally aligned with those of clip 2, as indicated in the Figure. Clip 1 and 2 GOPs spanning the cut point (408, 410) are extracted from the clip 1 and clip 2 streams respectively (FIG. 5, 502, 504). The extracted GOPs are decoded (412, 414, 506, 508), and assembled together to create an uncompressed bridge segment (416, 510). This bridge segment is then re-encoded into one (or two) GOP(s), the first having the normal length of the GOPs in each of the streams, and a short GOP to allow the remainder of the assembled stream to match the cadence of clip 2 (418, 512). Should the bridge segment be shorter than the normal length of the GOPs only the short GOP is produced. However, since first full clip 2 GOP 420 can no longer make references to its prior GOP in the clip 2 stream, it is converted into a Closed GOP using the conversion methods disclosed herein (515). This involves the use of decoded cut GOP 2 clip 414 to satisfy the backward references of the first B frames of GOP 420 during the decoding step of the conversion method. Final encoded assembled bitstream 422 includes clip 1 GOPs 424, bridge GOPs 426, first full clip 2 GOP converted into Closed GOP 420, and the remaining clip 2 GOPs 428.

Figure 6:
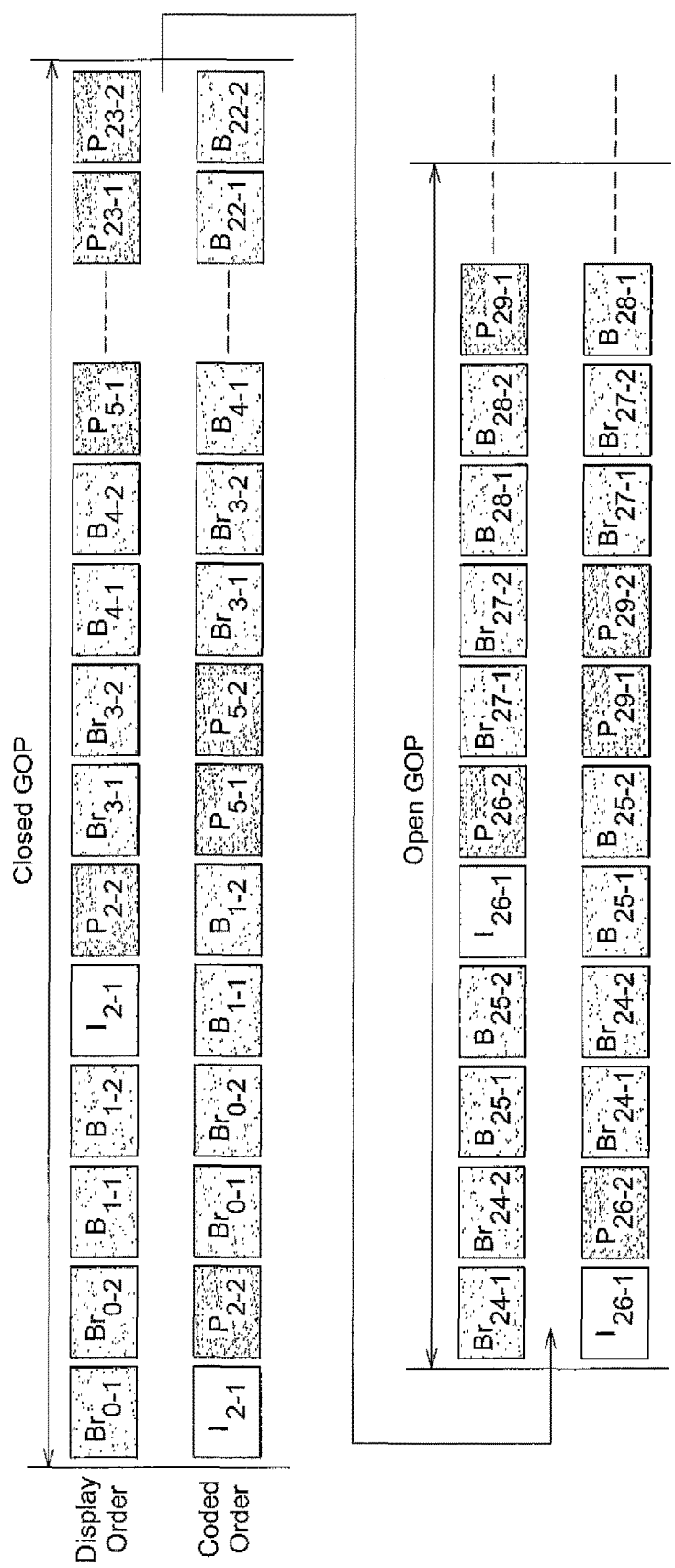
FIG. 6 illustrates the display order and coded order of video frames in an exemplary interlaced video bitstream.

A variation of the method described above may be used to convert an Open GOP to a Closed GOP when the encoded bitstream represents interlaced fields. An exemplary Closed GOP followed by an Open GOP of an interlaced field encoded stream is illustrated in FIG. 6. The -1 and -2 suffixes refer to the first and second fields respectively. As in the progressive case, only certain frames near the beginning of the GOP undergoing conversion require substitution. However, in this situation, re-encoding is required for certain frames in addition to the B frames displayed before the first I frame field since the B frame field immediately following the initial I frame field remains on the reference list of the decoder until some time after the substituted B frames are decoded. While the quality of each frame in the GOP undergoing conversion may undergo some degradation, the chain of backward references is terminated when the second I frame field is loaded into the decoder picture buffer.

The increase in efficiency and quality that result from the described conversion method as compared to existing methods depends on the specific codec used. For example, in certain Open GOP codecs, the encoded stream includes no Closed GOPs except for the start GOP. For streams encoded in this manner, existing methods require a complete decode/re-encode of the remainder of a clip following a cut point, since the chain of references continues to the end of the used portion of the clip, i.e., to the next cut point. By contrast, using the methods described herein, the re-encoding requirement is radically reduced. For each cut, at most only the GOP spanning the cut points in each of the clips being assembled at the cut and the first GOP immediately following the cut point need to be de-coded and re-encoded, i.e., a total of three GOPs. For example, for a 50-frame GOP size, this involves re-encoding a maximum of 150 frames per cut, of which on average only 100 frames would be included in the edited sequence.

Other Open GOP codecs include an IDR frame every few seconds. In this situation, the efficiency gain of using the described clip assembly method as compared to existing methods depends on the GOP size deployed, with the efficiency gain being greatest for smaller GOP sizes.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer. Various steps of a process may be performed by a computer executing such computer program instructions. The computer system may be a multiprocessor computer system or may include multiple computers connected over a computer network. The components shown in FIGS. 2 and 3 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of converting an open group of pictures (GOP) used in interframe video compression into a Closed GOP, the method comprising:
   receiving an encoded bitstream that has been encoded using Open GOP interframe video compression;
   extracting a first Open GOP from the bitstream;
   decoding at least part of the first Open GOP to generate a first group of uncompressed frames of video;
   extracting a second Open GOP sequentially following the first Open GOP in the bitstream, wherein the extracted second GOP comprises a series of encoded frames including an intra-coded picture (I frame);
   referring to at least one frame of the first group of uncompressed frames, decoding at least a part of the second Open GOP to generate a second group of uncompressed frames of video;
   re-encoding the second group of uncompressed frames to generate a re-encoded second GOP comprising one or more re-encoded bipredictive coded pictures (B frames) having a display order preceding an I frame of the second GOP, the re-encoded B frames being re-encoded with reference to a frame generated by decompressing the I frame of the second GOP as received in the bitstream and without reference to a frame of the first Open GOP;
   converting the second Open GOP to a corresponding Closed GOP, the Closed GOP comprising:
      the one or more re-encoded B frames;
      the I frame of the second GOP as received in the encoded bitstream, wherein the encoder flags the I frame of the second GOP as received in the encoded bitstream as an instantaneous decoder refresh (IDR) frame; and
      encoded data as received in the encoded bitstream for each frame of the second GOP that is displayed sequentially following the I frame of the second GOP.

2. The method of claim 1, wherein the bitstream represents part of an encoded video clip that is being consolidated to generate a consolidated video clip, and wherein the second Open GOP that is converted into a corresponding Closed GOP is a first full GOP of the consolidated video clip sequentially following a start point of the consolidated video clip.

3. The method of claim 2, wherein the start point of the consolidated video clip is a start point of the first full GOP of the consolidated video clip.

4. The method of claim 2, wherein the start point of the consolidated clip falls within the first GOP, and the consolidated clip includes a short GOP prior to the first full GOP, wherein the short GOP is a Closed GOP comprising frames of the first GOP temporally subsequent to the start point of the consolidated clip.

5. The method of claim 1, wherein the bitstream represents an encoded video clip that is being assembled into a sequence comprising portions of a plurality of clips, and wherein the second Open GOP that is converted into a corresponding Closed GOP is a first full GOP of a portion of the encoded video clip that is included in the assembled sequence.

6. The method of claim 1, wherein the encoded bitstream is encoded using intraframe compression in addition to the Open GOP interframe compression.

7. The method of claim 6, wherein the intraframe compression is lossy.

8. The method of claim 1, wherein the bitstream is an H.264 encoded bitstream.

9. A computer program product comprising:
a non-transitory computer-readable medium with computer program instructions encoded thereon, wherein the computer program instructions, when processed by a computer, instruct the computer to perform a method of converting an open group of pictures (GOP) used in interframe video compression into a Closed GOP, the method comprising:
receiving an encoded bitstream that has been encoded using Open GOP interframe video compression;
extracting a first Open GOP from the bitstream;
decoding at least part of the first Open GOP to generate a first group of uncompressed frames of video;
extracting a second Open GOP sequentially following the first Open GOP in the bitstream, wherein the extracted second GOP comprises a series of encoded frames including an intra-coded picture (I frame);
referring to at least one frame of the first group of uncompressed frames, decoding at least a part of the second Open GOP to generate a second group of uncompressed frames of video;
re-encoding the second group of uncompressed frames to generate a re-encoded second GOP comprising one or more re-encoded bipredictive coded pictures (B frames) having a display order preceding an I frame of the second GOP, the re-encoded B frames being re-encoded with reference to a frame generated by decompressing the I frame of the second GOP as received in the bitstream and without reference to a frame of the first Open GOP;
converting the second Open GOP to a corresponding Closed GOP, the Closed GOP comprising:
the one or more re-encoded B frames;
the I frame of the second GOP as received in the encoded bitstream, wherein the encoder flags the I frame of the second GOP as received in the encoded bitstream as an instantaneous decoder refresh (IDR) frame; and
encoded data as received in the encoded bitstream for each frame of the second GOP that is displayed sequentially following the I frame of the second GOP.

* * * * *